(12) United States Patent
Itou et al.

(10) Patent No.: US 10,608,578 B2
(45) Date of Patent: Mar. 31, 2020

(54) FASTENING DEVICE AND FASTENING METHOD OF SOLAR CELL MODULE

(71) Applicant: Solar Frontier K. K., Tokyo (JP)

(72) Inventors: Daisuke Itou, Tokyo (JP); Tatsuji Kanbara, Tokyo (JP)

(73) Assignee: Solar Frontier K. K., Tokyo (JP)

( * ) Notice: Subject to any disclaimer, the term of this patent is extended or adjusted under 35 U.S.C. 154(b) by 150 days.

(21) Appl. No.: 14/905,696

(22) PCT Filed: Jun. 16, 2014

(86) PCT No.: PCT/JP2014/065932
§ 371 (c)(1),
(2) Date: Jan. 15, 2016

(87) PCT Pub. No.: WO2015/008570
PCT Pub. Date: Jan. 22, 2015

(65) Prior Publication Data
US 2016/0173024 A1      Jun. 16, 2016

(30) Foreign Application Priority Data
Jul. 19, 2013   (JP) ................................. 2013-151131

(51) Int. Cl.
*H02S 30/10*   (2014.01)
*H02S 20/23*   (2014.01)
(Continued)

(52) U.S. Cl.
CPC .............. *H02S 30/10* (2014.12); *F24S 25/20* (2018.05); *F24S 25/35* (2018.05); *F24S 25/65* (2018.05);
(Continued)

(58) Field of Classification Search
CPC ........... F24S 2025/014; F24S 2025/018; F24S 2020/11; F24S 25/35; F24S 25/20;
(Continued)

(56) References Cited

U.S. PATENT DOCUMENTS

2011/0209745 A1*   9/2011   Korman ................. H02S 20/00
136/251
2012/0060901 A1   3/2012   Schnitzer
(Continued)

FOREIGN PATENT DOCUMENTS

DE   20 2010 017 458   1/2012
EP   2 541 618   1/2013
(Continued)

OTHER PUBLICATIONS

English translation of WO2012123797, 2012.*
(Continued)

*Primary Examiner* — Uyen M Tran
(74) *Attorney, Agent, or Firm* — Morrison & Foerster LLP (57) ABSTRACT

A fastening device which reduces the work by screwing and shortens the installation time has been desired. A fastening device 100 which fastens and supports a plurality of solar cell modules 20 includes a base part 111, a first module support part 113 which has a first support surface 113a and which is provided at the base part to be able to elastically displace, a second module support part 114 which has a second support surface 114a and which is provided at the base part, wherein the second support surface is arranged so that the second support surface is away from the first support surface of the first module support part when not elastically displaced at a constant first interval T2, a third module support part 123 which has a third support surface 123a and which is provided at the base part to be able to elastically (Continued)

displace, and a fourth module support part 124 which has a fourth support surface 124a, which fourth module support part is arranged a constant second interval T3 which is smaller than the first interval T2.

3 Claims, 11 Drawing Sheets

(51) Int. Cl.
*F24S 25/20* (2018.01)
*F24S 25/65* (2018.01)
*F24S 25/35* (2018.01)
*F24S 25/00* (2018.01)
*F24S 20/00* (2018.01)

(52) U.S. Cl.
CPC ........... *H02S 20/23* (2014.12); *F24S 2020/11* (2018.05); *F24S 2025/014* (2018.05); *F24S 2025/018* (2018.05); *Y02B 10/12* (2013.01); *Y02E 10/47* (2013.01)

(58) Field of Classification Search
CPC .......... F24S 25/65; H02S 30/10; Y02E 10/47; Y02B 10/12
See application file for complete search history.

(56) References Cited

U.S. PATENT DOCUMENTS

| | | | |
|---|---|---|---|
| 2013/0335877 A1 | 12/2013 | Keller | |
| 2014/0109954 A1* | 4/2014 | Kanbara | H01L 31/042 136/251 |

FOREIGN PATENT DOCUMENTS

| | | | |
|---|---|---|---|
| JP | 2006-9514 | 1/2006 | |
| JP | 2006332286 | * 12/2006 | ............. H01L 31/00 |
| JP | 2012-104756 | 5/2012 | |
| JP | 2012-160631 | 8/2012 | |
| JP | 2013-138040 | 7/2013 | |
| JP | 2013-194433 | 9/2013 | |
| WO | WO-2010/063815 | 6/2010 | |
| WO | WO-2012/123797 | 9/2012 | |
| WO | WO-2012/165437 | 12/2012 | |

OTHER PUBLICATIONS

Dec. 2006, Translation of JP2006332286.*
International Search Report dated Aug. 5, 2014, directed to International Application No. PCT/JP2014/065932, 2 pages.
Extended Search Report dated Dec. 6, 2016, directed towards EP Application No. 14826280.01, 9 pages.

* cited by examiner

FASTENING DEVICE AND FASTENING METHOD OF SOLAR CELL MODULE

CROSS-REFERENCE TO RELATED APPLICATIONS

This application is a national stage application under 35 U.S.C. 371 of International Application No. PCT/JP2014/065932, filed Jun. 16, 2014, and which claims priority to Japanese Patent Application No. 2013-151131, filed Jul. 19, 2013, the contents of which are incorporated herein by reference in their entirety.

FIELD OF THE INVENTION

The present invention relates to a fastening device which fastens a solar cell module to a roof or other installation surface and a fastening method of a solar cell module which uses the fastening device.

BACKGROUND OF THE INVENTION

In recent years, due to interest in the environment and government policies etc., solar cells are increasingly being installed at public facilities, general homes, and all other locations. A solar cell utilizes sunlight, because it is installed outside such as on a roof or a rooftop. To make effective use of the installable surface, a plurality of solar cell modules (also called "solar cell panels") are often aligned to form a solar cell array.

A solar cell module is installed on an installation surface such as a roof of a house or a rooftop of a building. Therefore, it is necessary to use a fastening device comprised of a mounting frame or beam members to firmly fasten it on the installation surface so to prevent it from being blown off by wind, rain, etc.

For the user of a solar cell module, the efficiency of power generation of the solar cell module and the installation cost are also important. This installation cost is based on not only the price of the solar cell module itself, but also the installation time of the worker installing the solar cell module on an installation surface. In the past, to keep down shifting or looseness of solar cell modules, screws have been used to attach the solar cell module to the frame, but screwing work performed on a roof had the danger of falling members or screws.

An object of Patent Literature 1 is to provide a mounting frame for installation of a solar cell panel which can keep down the installation cost and shorten the installation time and discloses a mounting frame for installation of a solar panel which supports a solar cell panel Sp at a slant by provision of a foundation part which is inserted on the base surface of a rooftop, a fastened side support base 11 provided standing while formed integrally with the foundation part and with different support rod heights, and a movable side support base 12. The movable side support base 12 of the mounting frame for the installation of the solar cell panel, which is shown in Patent Literature 1, is provided with a height adjustable part 15 which enables the movable foundation part 12a to be moved in accordance with the size of the solar cell to be supported, and which receives and supports the solar cell panel at a predetermined slant angle.

The mounting frame for the installation of the solar cell panel described in Patent Literature 1 has to be installed by a worker in a state while supporting the solar cell panel. Installation work while supporting a solar cell panel becomes complicated work. In the case of work on a home roof, the danger of the work also increases. Further, a holding part 15b which holds the solar cell panel is provided separately from the movable foundation part. That is, the movable foundation part and the holding part 15b are separated in structure, so the work is created of attaching the holding part 15b on the movable foundation part on a roof or other installation surface. The work becomes troublesome.

PATENT LITERATURE

Patent Literature 1: Japanese Patent Publication No. 2012-104756A

SUMMARY OF THE INVENTION

A fastening device which reduces the work by screwing when attaching a solar cell module to a frame and which shortens the installation time has been desired.

The present invention provides a fastening device which fastens and supports a plurality of solar cell modules comprising: a base part, a first module support part which has a first support surface that is able to support a first solar cell module and which is provided at the base part to be able to elastically displace, a second module support part which has a second support surface that is able to support a first solar cell module and which is provided at the base part, wherein the second support surface is arranged so that the second support surface is away from the first support surface of the first module support part when not elastically displaced at a constant first interval, a third module support part which has a third support surface that is able to support the second solar cell module and which is provided at the base part at the opposite side of the first module support part to be able to elastically displace, and a fourth module support part which has a fourth support surface that is able to support the second solar cell module and which is provided at the base part at the opposite side of the second module support part, wherein the fourth module support surface is arranged so that the fourth module support surface is away from the third support surface of the third module support part when not elastically displaced at a constant second interval which is smaller than the constant first interval.

The present invention further provides the fastening device wherein the second interval is smaller than a thickness of the solar cell module.

The present invention further provides the fastening device which has a groove between a joined part of the base part and the fourth module support part and the fourth support surface.

The present invention further provides the fastening device wherein the first module support part and the third module support part are formed as a single continuous flat plate.

The present invention further provides a fastening method using the fastening device to fasten a plurality of solar cell modules, the fastening method comprising: inserting a first solar cell module between the first support surface and the second support surface and inserting a second solar cell module between the third support surface and the fourth support surface to bias a third support surface to make the third module support part and first module support part elastically displace so that the first support surface pushes the first solar cell module to thereby fasten the first solar cell module.

According to the fastening device of the present invention, the second support surface is arranged a constant first interval away from the first support surface of the third module support part when not elastically displaced, while the fourth support surface is arranged a constant second interval smaller than the first interval away from the third support surface of the third module support part when not elastically displaced. Therefore, the second solar cell module biases the third support surface, whereby the first support surface pushes against the first solar cell module and a large frictional force is generated between the first solar cell module and the first support surface and second support surface. Therefore, even if not screwing in the solar cell module, it is possible to suppress shifting and sliding in the horizontal direction. It becomes possible to simplify the work of fastening a solar cell module and thereby possible to shorten the installation time and suppress the danger at the time of installation work.

DETAILED DESCRIPTION OF THE INVENTION

Below, referring to the attached drawings, embodiments of the present invention will be explained.

In the following embodiments, the same or similar components are assigned common reference notations. To facilitate understanding, these figures are suitably changed in scale. Further, note that the technical scope of the present invention is not limited to these embodiments and extends to the inventions described in the claims and their equivalents.

Figure 1:
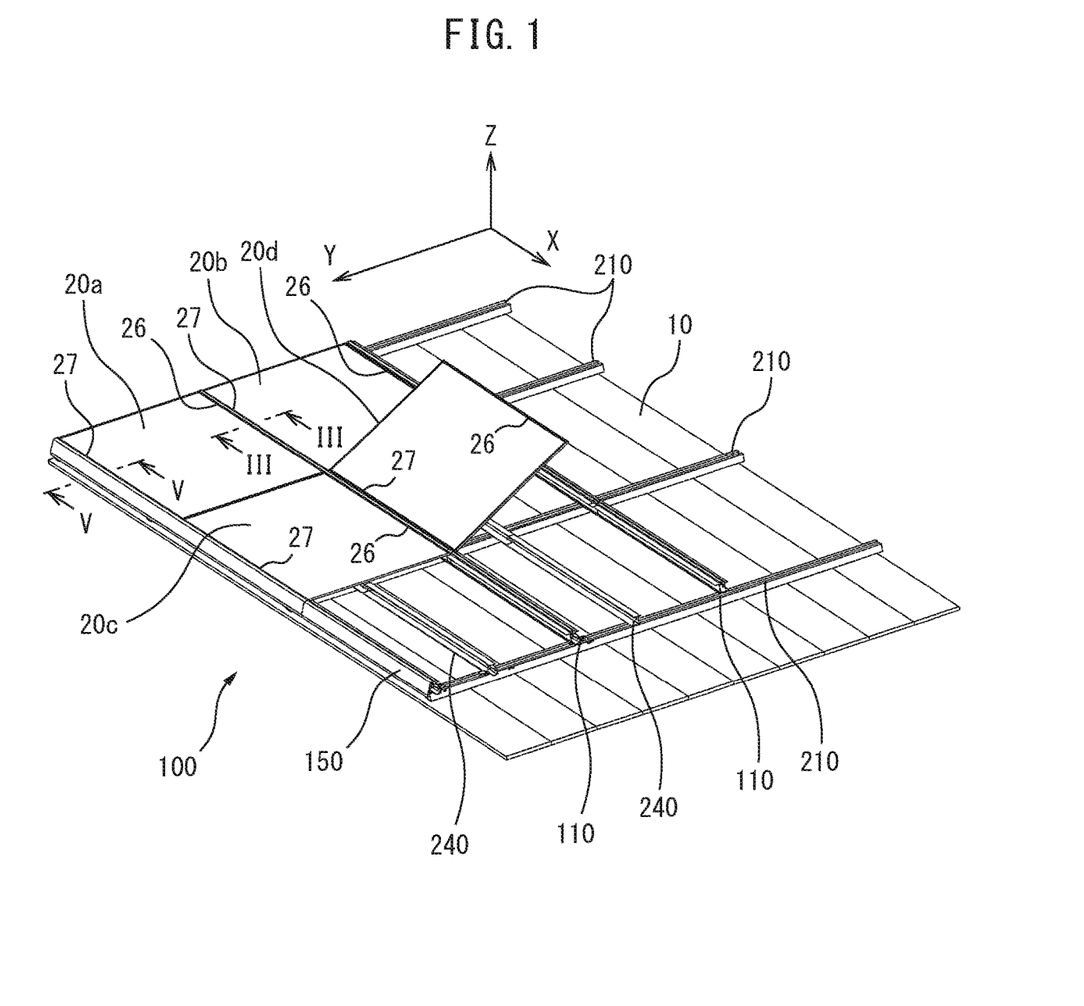
FIG. 1 is a perspective view showing a fastening device of a solar cell module according to an embodiment of the invention of the present application.

FIG. 1 is a perspective view which shows a fastening device 100 according to an embodiment of the present invention which fastens solar cell modules 20a to 20d (below, sometimes referred to all together as the "solar cell modules 20") on an installation surface 10 of a roof. As shown in FIG. 1, a plurality of solar cell modules 20 are successively arranged on the installation surface 10 in the vertical direction and horizontal direction and are fastened by the fastening device 100 to the installation surface 10. In this Description, as shown in FIG. 1, the slanted direction of the installation surface 10 of the roof, the direction from the upstream side to the downstream side, the direction from the ridge side to the eave side, and the arrow Y-direction of FIG. 1 will be called the "vertical direction", the arrow X-direction of FIG. 1 will be called the "horizontal direction", and the vertically upward direction with respect to the installation surface 10 and the arrow Z-direction of FIG. 1 will be called the "upward direction". Note that, FIG. 1 shows the later explained installation surface 10 and first mounting frames 110, second mounting frame 150, vertical beam members 210, and support rails 240 with part of the solar cell modules 20 which are omitted.

Figure 2A:
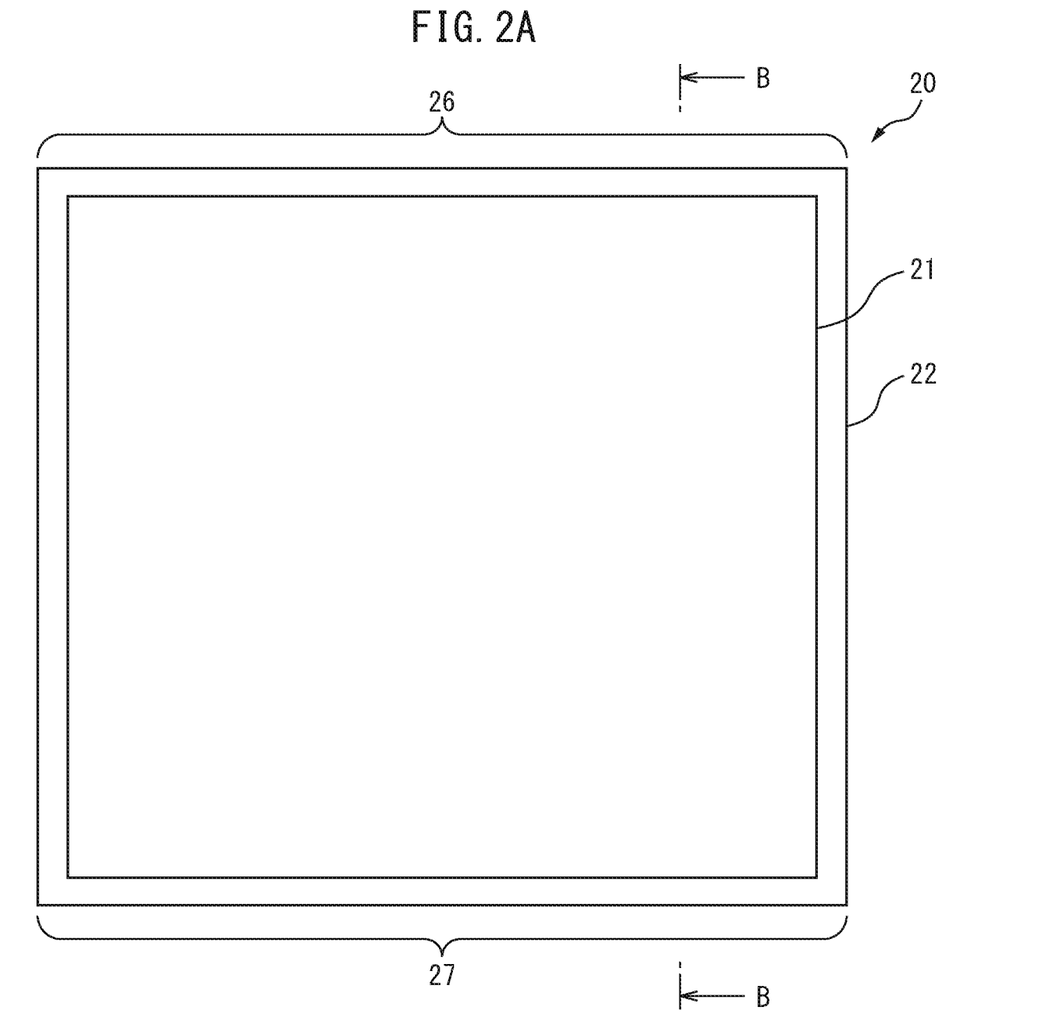
FIG. 2A is a plan view showing a solar cell module.
Figure 2B:
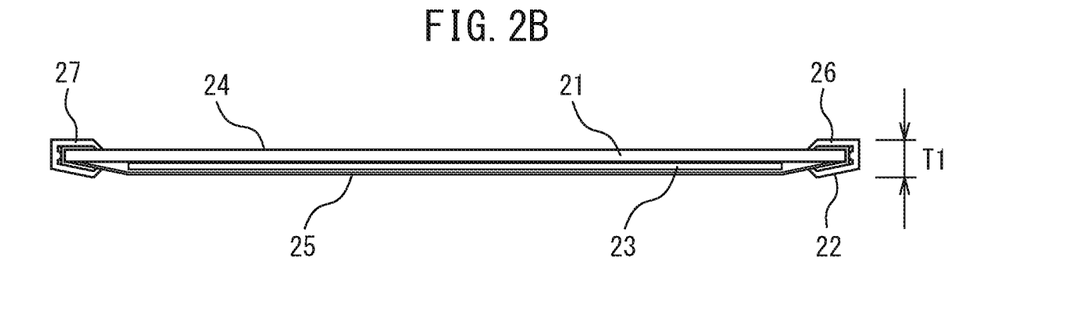
FIG. 2B is a cross-sectional view along the line B-B of FIG. 2A showing a solar cell module.

A solar cell module 20 which is fastened by the fastening device 100 of the present embodiment will be explained. FIG. 2A and FIG. 2B are a view showing the solar cell module 20, FIG. 2A is a plan view, and FIG. 2B is a cross-sectional view along the line B-B of FIG. 2A. The solar cell module 20 is comprised of a solar cell panel 21, a back surface member 23 which is provided at the back surface of the solar cell panel 21, and a frame member 22 (also called a gasket) which surrounds the solar cell panel 21. The solar cell panel 21 is a panel with is provided with a solar cell device which generates power upon receiving light and suitably has cover glass etc. laid over it to protect this solar cell device and thereby form a light-receiving surface of the solar cell module 20. The solar cell device which is used in the present embodiment may be any of a silicon crystal type (monocrystalline silicon or polycrystalline silicon), amorphous type (amorphous silicon), compound type (CIS, CdTe, GaAs, etc.), or organic type solar cell device etc. The type is not particularly limited. The frame member 22 is made of plastic and protects the circumference of the solar cell panel 21 from damage. In this Description, the surface on which the solar cell panel 21 is provided (including top surface of frame member 22) will be called the "top surface 24" (light-receiving surface), while the surface at the opposite side to the top surface 24 (including also bottom surface of frame member 22) will be called the "bottom surface 25" (non-light receiving surface). One of the side parts of the solar cell module 20 will be called the "first side part 26" while the side part at the opposite side to the first side part 26 will be called the "second side part 27". The illustrated solar cell module 20 is one with end parts at the circumference protected by being surrounded by a frame member 22 made of plastic, but a metal frame member may also be used. Further, as illustrated, the solar cell module 20 has a thickness T1 including the frame member 22.

The fastening device 100 of the present embodiment, as shown in FIG. 1, is a device which fastens a plurality of solar cell modules 20a to 20d, which is consecutively arranged on the installation surface 10. The fastening device 100 is installed on a plurality of vertical beam members 210 which are attached to the installation surface 10 from the upstream side toward the downstream side in the Y-direction of FIG.

1 at predetermined intervals in parallel with each other. The fastening device 100 is provided with a plurality of first mounting frames 110 which fasten and support solar cell modules 20 and guide members 212 which hold the first mounting frames in a manner to be able to move. Further, it is provided with the second mounting frame 150 which is arranged at the eave and fastens and supports the solar cell modules 20.

Figure 3:
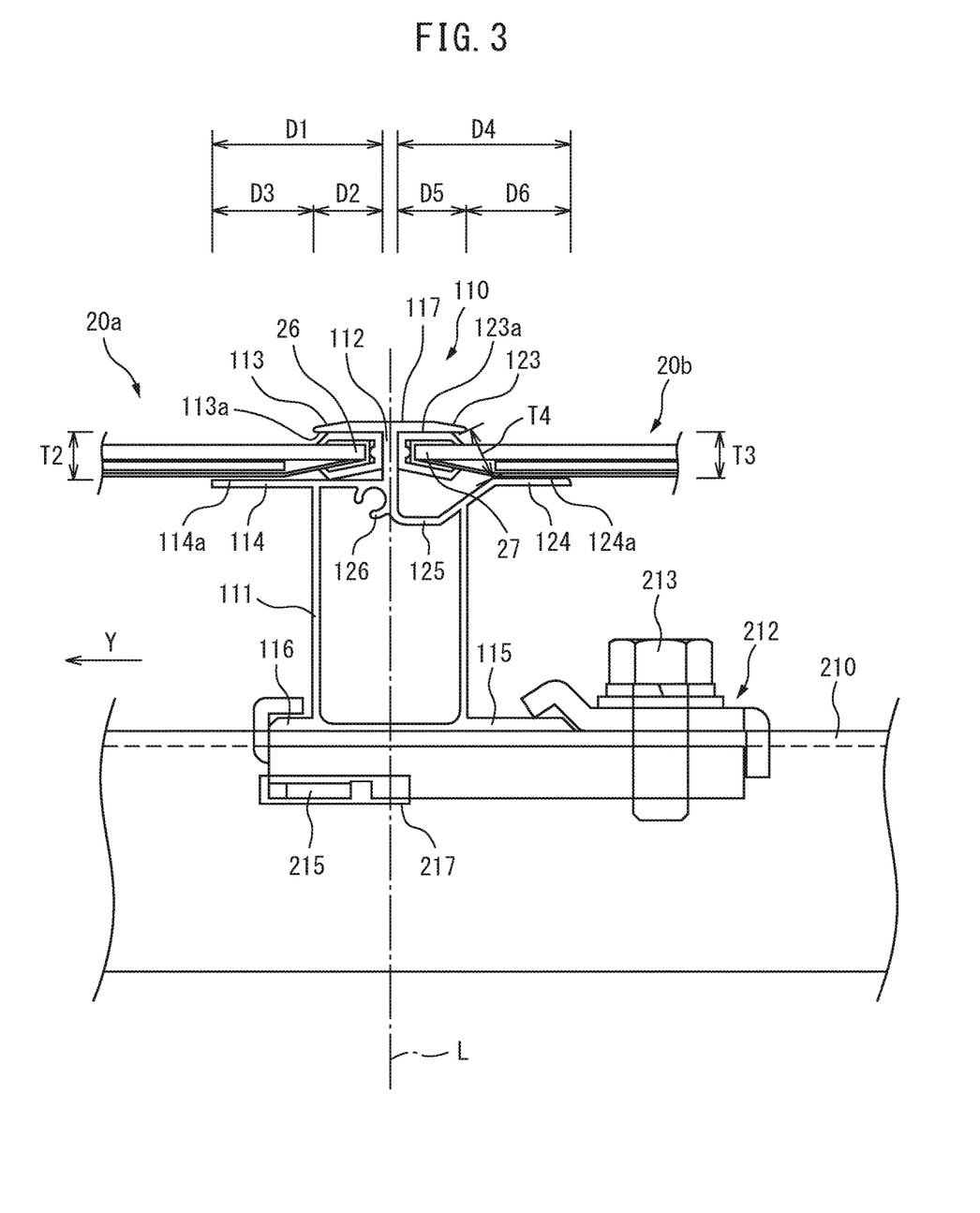
FIG. 3 is a cross-sectional view along the line III-III of FIG. 1 which shows a first mounting frame of the fastening device.

A first mounting frame 110, as shown in FIG. 3, has a base part 111 (including main wall part 112) which is arranged along a first side part 26 of the solar cell module 20a, a first module support part 113 which is provided at the base part 111 and which has a first support surface 113a which can support the top surface (light-receiving surface) of the solar cell module 20a at the first side part 26 side, and a second module support part 114 which has a second support surface 114a that can support the bottom surface (non-light receiving surface) of the solar cell module 20a at the first side part 26 side and which is provided at the base part 111. The second support surface 114a has a surface area larger than the first support surface 113a and is arranged at an interval T2 from the first support surface 113a to enable a first side part 26 of the solar cell module 20a to be clamped. The first module support part 113 and the second module support part 114 extend in the same direction from the base part 111 and is connected to the main wall part 112 to be integrally formed with it.

The first mounting frame 110 shown in FIG. 3 is configured to support the solar cell module 20a and adjoining solar cell module 20b. The base part 111 is sandwiched between them. The first mounting frame 110 is provided with a third module support part 123 which is provided at the base part 111 at the opposite side to the first module support part 113 and which has a third support surface 123a which can support the top surface (light-receiving surface) of the solar cell module 20b at the second side part 27 side and the first mounting frame 110 is provided with a fourth module support part 124 which is provided at the base part 111 at the opposite side to the second module support part 114 a constant interval T3 away from the third support surface 123a enabling the second side part 27 of the solar cell module 20b to be clamped and which can support a bottom surface (non-light receiving surface) of the solar cell module 20b at the second side part 27 side. The second side part 27 of the solar cell module 20b is clamped by the third module support part 123 and the fourth module support part 124. The interval T3 between the third support surface 123a and the fourth support surface 124a is preferably formed smaller than the thickness T1 of the solar cell module 20.

The length D1 by which the second support surface 114a can support the solar cell module 20a (length D1 by which the second module support part 114 extends from the main wall part 112) is formed longer than the length D2 by which the first support surface 113a can support the solar cell module 20a (length D2 by which the first module support part 113 extends from the main wall part 112). Further, the base part 111 of the first mounting frame 110 is held on the vertical beam member 210 of the installation surface 10 to be able to move in a direction substantially parallel to the first support surface 113a and second support surface 114a, that is the illustrated arrow Y direction, by the guide member 212. The interval T2 between the first support surface 113a of the first module support part 113 and the second support surface 114a of the second module support part 114 is preferably substantially the same as the thickness T1 of the solar cell module 20 or a thickness larger than that.

Figure 5A:
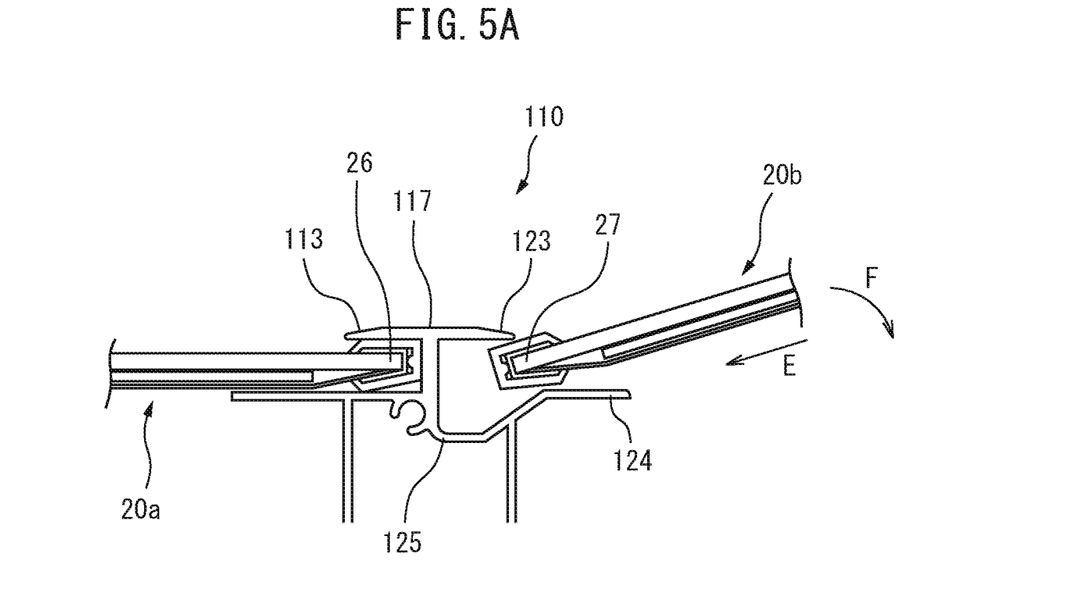
FIG. 5A is a view showing the state immediately before fastening a solar cell module to the first mounting frame.

The first mounting frame 110 is formed at the base of the fourth module support part 124 (part connecting fourth module support part 124 and base part 111) with a groove 125 which enables insertion of the second side part 27 of the solar cell module 20b from between the third support surface 123a and the fourth support surface 124a. When attaching the solar cell module 20b to the first mounting frame 110, the groove 125 can be utilized, as shown in FIG. 5A, to insert the solar cell module 20b from an upward slanted direction (arrow E direction of FIG. 5A) between the third support surface 123a and the fourth support surface 124a. By lowering the solar cell module 20b in the arrow F direction after insertion, the first side part 26 of the solar cell module 20b can be placed at the second module support part 114 of the other first mounting frame (see FIG. 10B) and the solar cell module 20b can be installed in parallel with the installation surface 10. Compared with when inserting the solar cell module 20 from a direction parallel to the installation surface 10 (the illustrated Y-direction), the worker is not forced into an unnatural posture and the burden at the time of work is lightened. Further, in the illustrated embodiment, the interval 14 between the groove 125 and the third support surface 123a is formed broader than the interval T3 between the third support surface 123a and the fourth support surface 124a. It is possible to easily insert the second side part 27 of the solar cell module 20b. Further, the groove 125 can be used as a drainage groove.

The first module support part 113 and third module support part 123 which are provided at the first mounting frame 110 of the present embodiment are connected with each other. The first module support part 113 is provided elastically displaceably at the base part 111, while the second module support part 114 is arranged with the second support surface 114a a constant first interval T2 away from the first support surface 113a when not elastically displaced. Further, the third module support part 123 is provided elastically displaceably at the base part 111, while the fourth support surface 124a of the fourth module support part 124 is arranged, at a constant second interval T3 which is smaller than the first interval T2, from the third support surface 123a of the third module support part 123 when not elastically displaced. The second interval T3, as shown in FIG. 3, is the distance in the vertical direction between the third support surface 123a and the fourth support surface 124a.

Figure 5B:
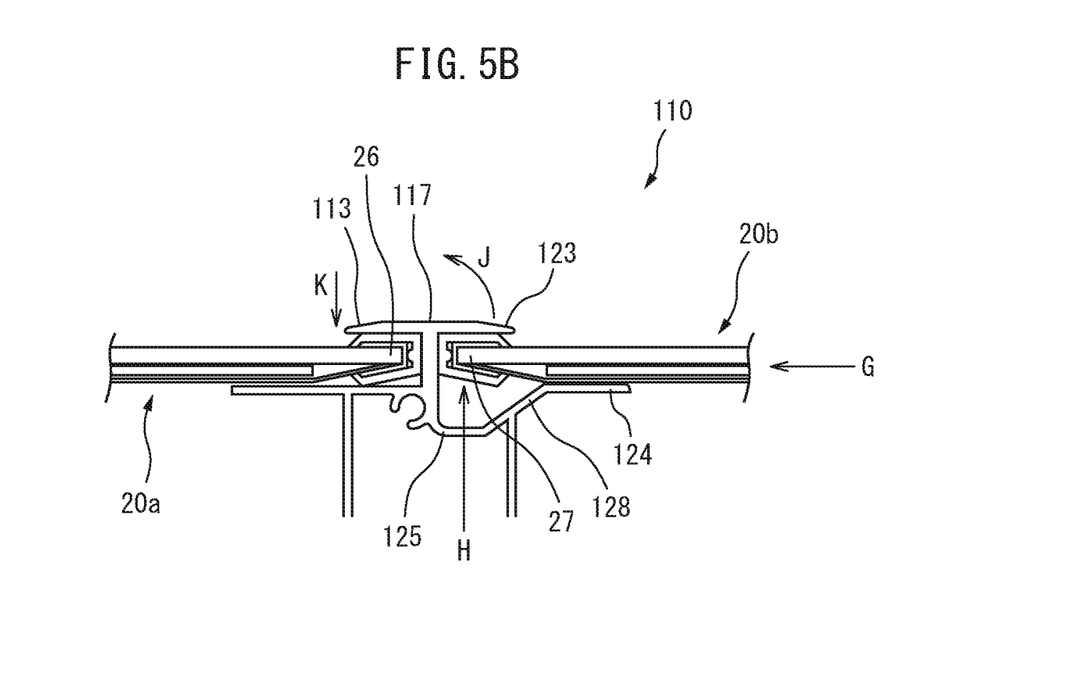
FIG. 5B is a view showing the state of fastening a solar cell module to the first mounting frame.

By being configured in this way, if the solar cell module 20a is inserted and supported between the first module support part 113 and second module support part 114, then the solar cell module 20b is inserted between the third module support part 123 and the fourth module support part 124, the top surface of the solar cell module 20b causes the third module support part 123 to be biased in the arrow H direction of FIG. 5B and to rotate in the arrow J direction. In the illustrated embodiment, the contact point 128 of the fourth module support part 124 and the groove 125 (see FIG. 5B) becomes the supporting point and is more strongly pushed up. Due to this, the first module support part 113 descends in the arrow K direction and pushes against the top surface of the first side part 26 of the solar cell module 20a. Due to this pushing action, the solar cell module 20a is more strongly fastened. By just insertion and clamping, there is a possibility that the solar cell module 20a will shift in the horizontal direction, so screws etc. were used to fasten it in some cases. By using the first module support part 113 for pushing to fasten the solar cell module 20a like with the first mounting frame 110 of the present embodiment, shifting or looseness of the solar cell module can be prevented. Further, there is no longer a need to use screws etc. to fasten the solar cell module and the work time can be shortened.

Figure 4:
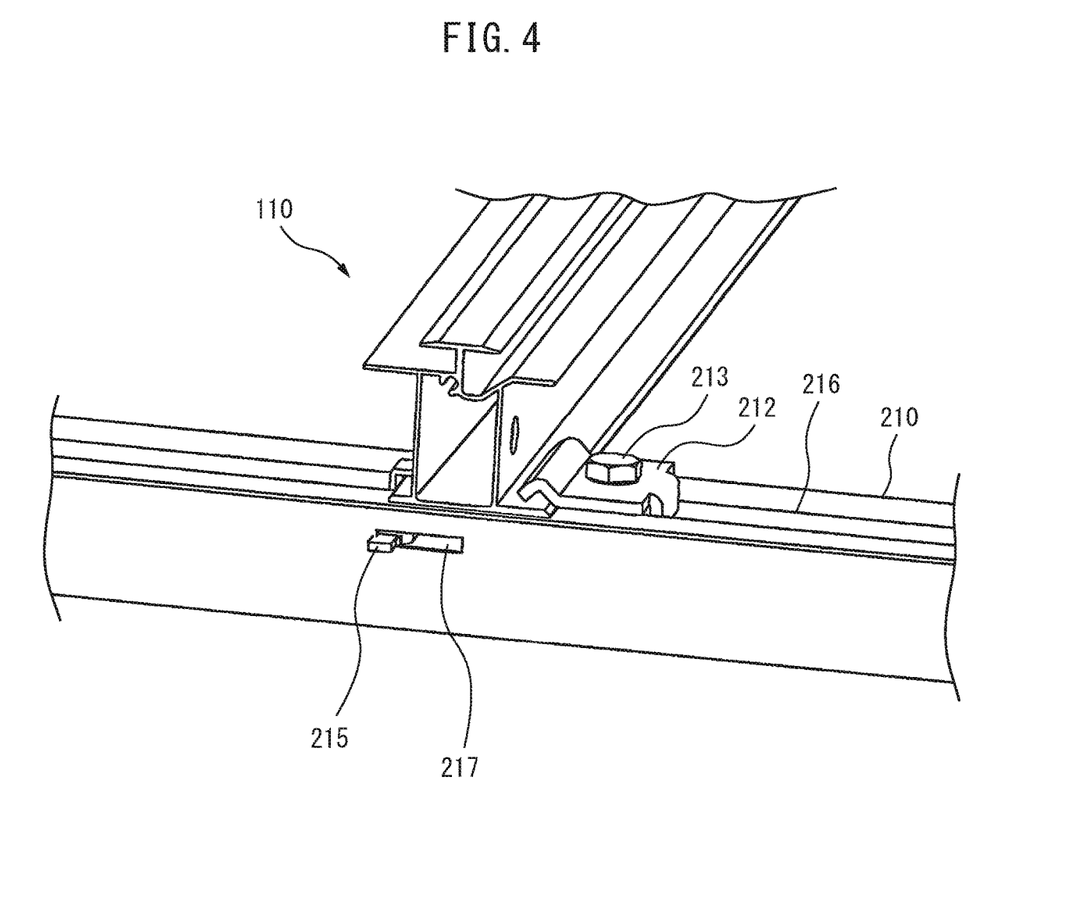
FIG. 4 is a perspective view showing the first mounting frame and a guide member.

The first mounting frame 110 has flange parts 115, 116 which extend from the bottom end of the base part 111. As shown in FIGS. 3 and 4, the guide member 212 holds the base part 111 of the first mounting frame 110 through the flange parts 115, 116 to be able to move in a direction substantially parallel to the first support surface 113a and second support surface 114a.

A vertical beam member 210 is a hollow elongated member. As shown in FIG. 4, its top surface has a slit 216 formed along the longitudinal direction. The guide member 212 is configured to move along the slit 216. The guide member 212 is fastened to a vertical beam member 210 by fastening a fastening member 213 (bolt).

At the side part of a vertical beam member 210, as shown in FIG. 3 and FIG. 4, an elongated hole 217 is formed. The guide member 212 has a projecting part 215 which is inserted into the elongated hole 217. The guide member 212 is restricted in range of movement by the projecting part 215 abutting against the end part of the elongated hole 217. By restricting the range of movement of the guide member 212, the range of movement of the first mounting frame 110 is restricted and a worker can be prevented from mistakenly dropping the first mounting frame 110.

The difference D3 of length between the length D1 by which the second support surface 114a of the second module support part 114 can support the solar cell module 20a and the length D2 by which the first support surface 113a of the first module support part 113 can support the solar cell module 20a is preferably longer than the range over which the guide member 212 can move. When detaching a solar cell module 20, if the first mounting frame 110 is slid by a length D3 or more of length to the ridge side (direction opposite to the illustrated Y-direction), there is a possibility that the second module support part 114 cannot support the solar cell module 20 and the solar cell module 20 will fall off. By making the range over which the guide member 212 can move smaller than the difference D3 of length, the solar cell module 20 can be kept from falling off.

Further, in the illustrated embodiment, the length D4 by which the fourth module support part 124 extends from the main wall part 112 of the base part 111 is longer than the length D5 by which the third module support part 123 extends from the main wall part 112 of the base part 111. By the fourth module support part 124 being longer than the third module support part 123, for example, before fastening the solar cell module 20, the fourth module support part 124 and the second module support part 114 which supports the other side part can work together to temporarily place the solar cell module 20 on the fastening device 100.

Figure 6:
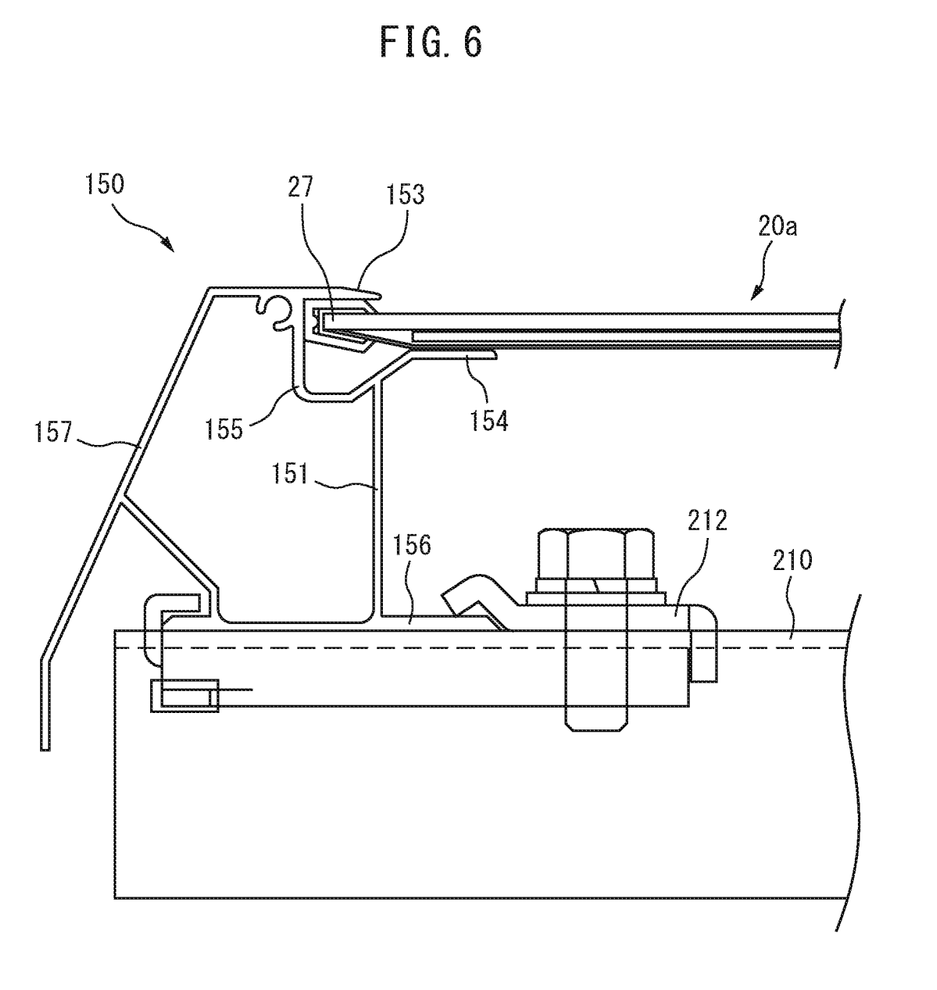
FIG. 6 is a cross-sectional view along the line IV-IV of FIG. 1 which shows a second mounting frame of the fastening device.

FIG. 6 shows one example of the second mounting frame 150 which holds the second side part 27 of the solar cell module 20a. The second mounting frame 150 is provided with a base part 151, a third module support part 153 which is provided at a top end of the base part 151 and which has a third support surface 153a that can support the top surface at the second side part 27 side of the solar cell module 20a, and a fourth module support part 154 which has a fourth support surface 154a that can support the bottom surface of the solar cell module 20a at the second side part 27 side and which is arranged so that the fourth support surface 154a is spaced at a constant interval T3 from the third support surface 153a so as to clamp the second side part 27 of the solar cell module 20a. The second mounting frame 150 is sometimes provided at the eave side of the roof. To improve the appearance, a cosmetic board 157 is applied at the eave side of the second mounting frame 150. Further, the second frame 150 is formed at the base of the fourth module support part 154 with a groove 155 which enables insertion of the second side part 27 of the solar cell module 20a from between the third support surface 153a and the fourth support surface 154a. In the same way as the groove 125 which is shown in FIG. 3, the groove 155 can also be utilized as a drainage groove.

The bottom end of the base part 151 is provided with a flange part 156. The second mounting frame 150 is fastened through the flange part 156 to the vertical beam member 210. In the illustrated embodiment, the second mounting frame 150, like the first mounting frame 110, uses the guide member 212 for fastening to the vertical beam member 210, but the second mounting frame 150 need not move. Bolts etc. may also be used to directly fasten it to the vertical beam member 210.

Figure 7A:
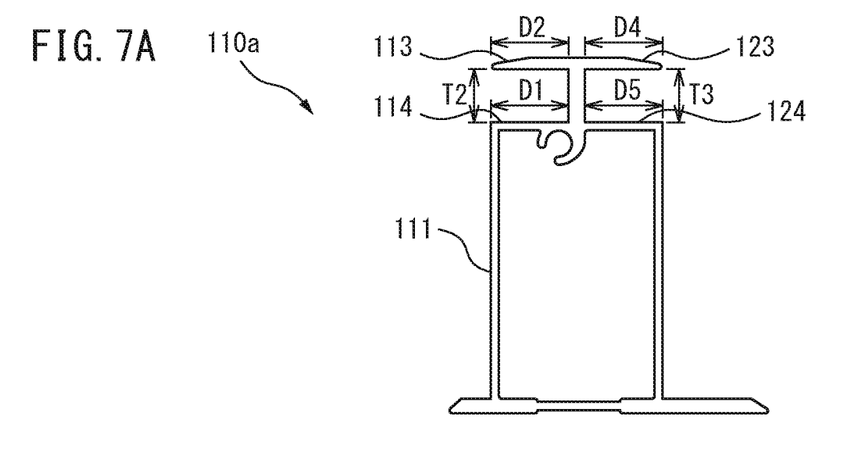
FIG. 7A is a cross-sectional view showing another example of the first mounting frame of a fastening device.
Figure 7B:
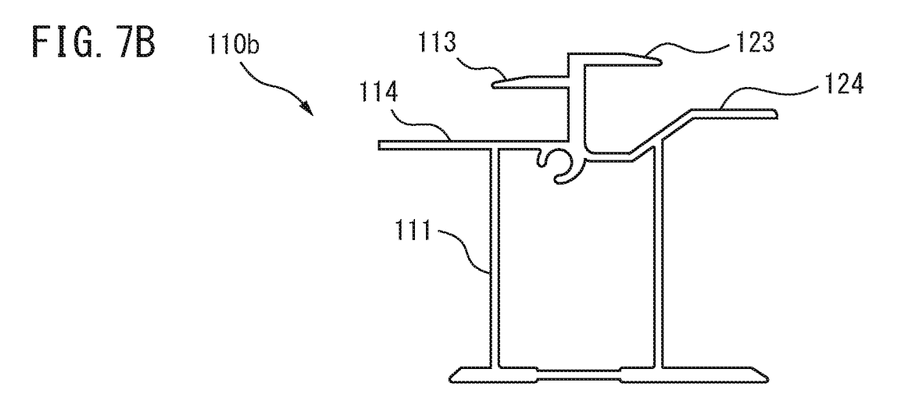
FIG. 7B is a cross-sectional view showing another example of the first mounting frame of a fastening device.
Figure 7C:
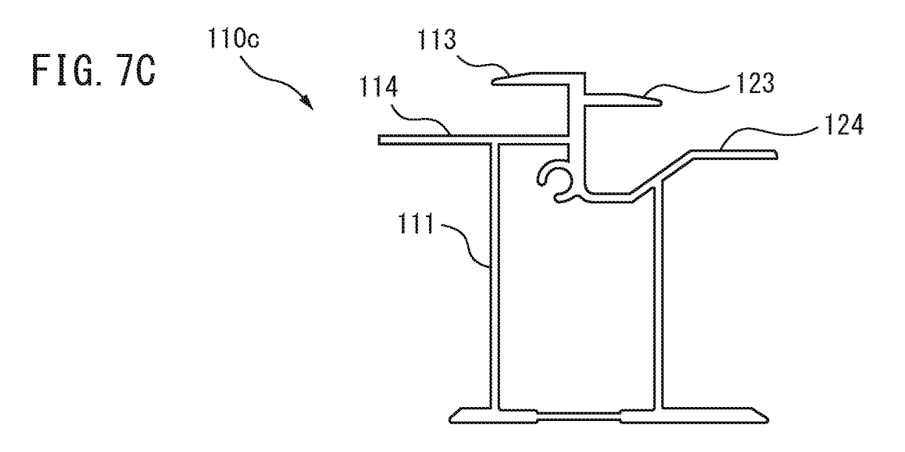
FIG. 7C is a cross-sectional view showing another example of the first mounting frame of a fastening device.

FIG. 7A to FIG. 7C show first mounting frames 110a to 110c of other examples of the first mounting frame 110. The first mounting frame is arranged with the second support surface a constant first interval T2 away from the first support surface of the first module support part when not elastically displaced, while the fourth support surface is arranged a constant second interval T3 smaller than the first interval T2 away from the third support surface of the third module support part when not elastically displaced. Further, the first interval T2 need be substantially the same thickness as the thickness T1 of the solar cell module or larger than that, while the second interval T3 need be smaller than the thickness T1 of the solar cell module. As shown in the first mounting frame 110a shown in FIG. 7A, the length D1 by which the second support surface 114a can support the solar cell module 20a need not be longer than the length D2 by which the first support surface 113a can support the solar cell module 20a. Further, the length D4 by which the fourth support surface 124a can support the solar cell module 20b need not be longer than the length D5 by which the third support surface 123a can support the solar cell module 20b. So long as the second side part 27 of the solar cell module 20b can be inserted between the third support surface 123a and the fourth support surface 124a, the groove 125 need not be provided.

The first mounting frame 110 shown in FIG. 3 is formed with the first module support part 113 and the third module support part 123 as a single continuous flat plate. The shapes of the first module support part 113 and the third module support part 123 are not limited to this. For example, like in the first mounting frames 110b, 110c shown in FIG. 7B and FIG. 7C, a step difference may be formed between the first module support part 113 and the third module support part 123. In this case, while the same as in FIG. 3 and FIG. 7A, the first module support part 113 and the third module support part 123 are connected to a single main wall part 112, whereby in other words, the main wall part to which the first module support part 113 is connected and the main wall part to which the third module support part 123 is connected are made common, whereby when the solar cell module 20b is inserted into the mounting frame 110, as shown in FIG. 5A and FIG. 5B, the first module support part 113 can push against the already inserted solar cell module 20a using the main wall part 112 as a support point.

The first mounting frame 110 shown in FIG. 3 and the second mounting frame 150 shown in FIG. 6 clamp the side part of the solar cell module 20 from above and below and fasten the solar cell module 20 by only friction in the longitudinal direction of the first mounting frame 110 (X direction of FIG. 1). For this reason, when years elapse from installation of a solar cell module 20, the solar cell module 20 moves in the longitudinal direction of the first mounting frame 110 and second mounting frame 150 (horizontal direction or X direction) and may stick out from the first mounting frame 110 or the second mounting frame 150. To eliminate this, the solar cell module 20 is attached, then an end cover is attached to the first mounting frame 110 and second mounting frame 150 so as to close the opening between the first support surface 113a and second support surface 114a, the opening between the third support surface 123a and fourth support surface 124a, and the opening of the groove 125 and movement of the solar cell module in the horizontal direction is prevented. In the past, when attaching the end cover to the mounting frame, since the positions of the screw holes differ at the left and right end parts of the mounting frame, the end cover 230 had to be formed matching the positions of the screw holes at the end parts.

Figure 8A:
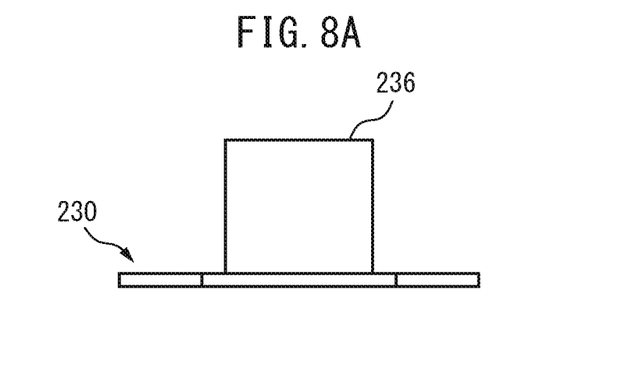
FIG. 8A is a plan view showing an end cover.
Figure 8B:
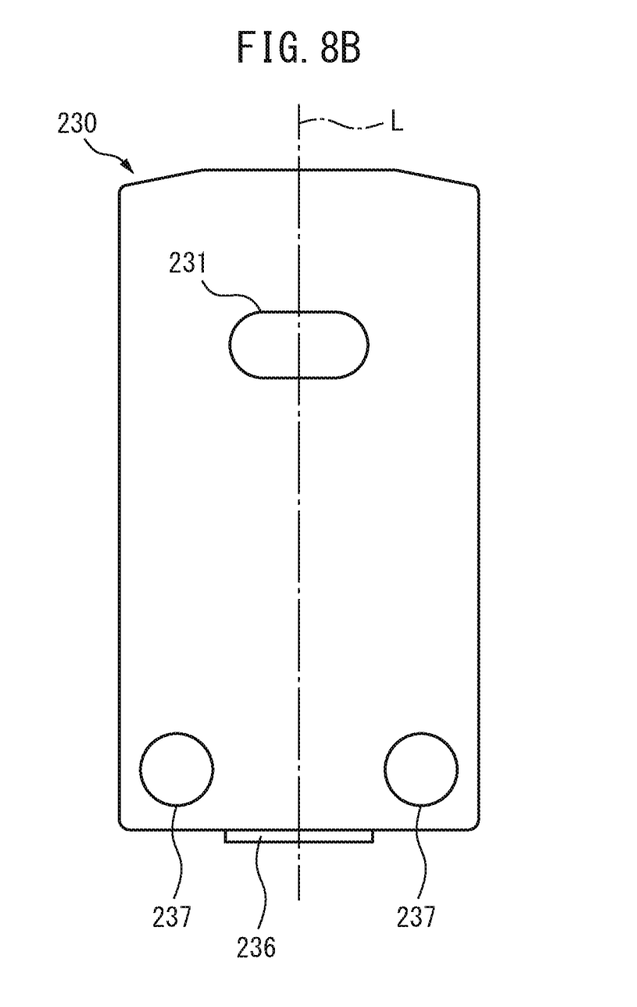
FIG. 8B is a front view showing the end cover.
Figure 8C:
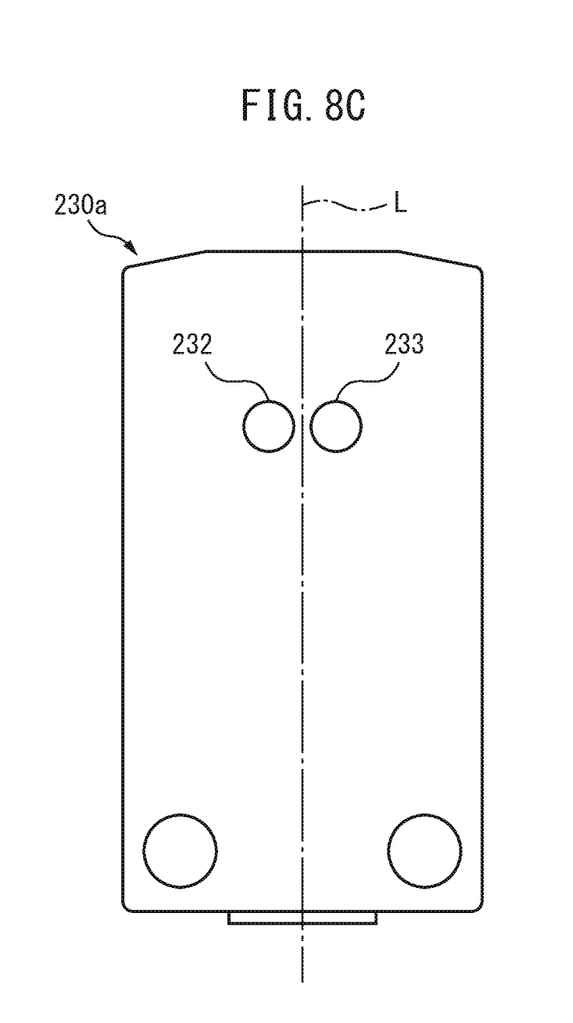
FIG. 8C is a front view showing another example of the end cover.
Figure 9:
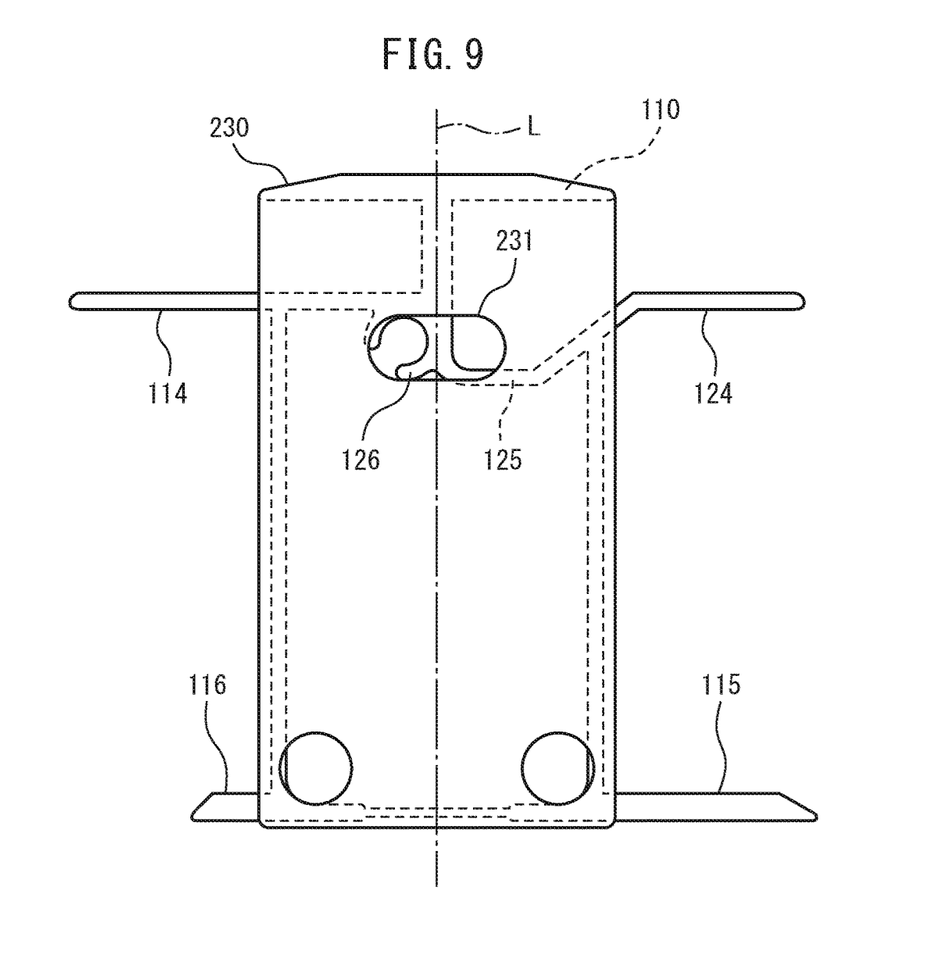
FIG. 9 is a view showing a state where an end cover is attached to the first mounting frame of the fastening device.

FIG. 8 is a view showing the end cover 230 which is attached to an end part of the first mounting frame 110 of the present embodiment, wherein FIG. 8A is a plan view, FIG. 8B is a front view, and FIG. 8C is a front view showing another example. FIG. 9 is a view showing the state where the end cover 230 is attached to the end part of the first mounting frame 110.

The first mounting frame 110, as explained above, is formed with the groove 125 and a screw hole 126 for attaching the end cover 230 at positions substantially symmetric to the left and right about the center line L in the width direction of the base part 111 (see FIG. 3). Further, the end cover 230 is formed so that when attaching the end cover 230 to the first mounting frame 110, the elongated hole 231 which connects the screw hole 126 and the groove 125 becomes symmetric to the left and right about the center line L in the width direction of the end cover 230. In the illustrated embodiment, the elongated hole 231 is formed, but as shown by the end cover 230a shown in FIG. 8C, two holes 232, 233 may be formed at positions symmetric to the left and right of the center line L in the width direction. By forming the elongated hole 231 and the holes 232, 233 like in the end covers 230, 230a of the illustrated embodiment, it is possible to make common use of the end covers 230, 230a which close the two ends of the first mounting frame 110. Further, the rainwater which flows into the groove 125 can be drained from the elongated hole 231 of the end cover 230 connected to the groove, or the hole 232 or the hole 233 of the end cover 230a.

The end covers 230, 230a are provided with leg parts 236 so that the end covers 230, 230a can stand when attaching them to the first mounting frame 110. At the bottom end parts of the end covers 230, 230a, two drainage holes 237 are formed for draining water which flows to the inside of the base part 111 of the first mounting frame 110.

The fastening device 100 of the present embodiment is a structure using the first mounting frames 110 and the second mounting frame 150 to support two facing side parts of a solar cell module (first side part 26 and second side part 27). The other two side parts of the solar cell module other than the first side part 26 and second side part 27 are not supported, so the load performance of the solar cell module deteriorates compared with the case where all of the four side parts surrounding the solar cell module are supported. To improve this load performance, as shown in FIG. 1, the fastening device 100 of the present embodiment may be provided with support rails 240 (support members) which support the bottom surfaces of the solar cell modules 20. The support rails 240 shown in FIG. 1 are provided in the horizontal direction (X direction) spanning the first mounting frames 110 and the second mounting frame 150, two first mounting frames 110, or two or more vertical beam members 210. The method of installation of the support rails 240 is not limited to this. The support rails 240 can also be directly arranged at the installation surface 10. Further, they may be arranged spanning the first mounting frame 110 and the second mounting frame 150 or two first mounting frames 110.

Referring to FIGS. 10A to 10D, the method of fastening a solar cell module 20 using the fastening device 100 of the present embodiment will be explained.

A plurality of vertical beam members 210 are arranged on the installation surface 10 in parallel to each other in the vertical direction. Next, the second mounting frame 150 is arranged at the eave side and is fastened on the vertical beam members 210.

The plurality of first mounting frames 110 are arranged on the vertical beam members 210. Each first mounting frame 110 is then attached in a slidable manner using a guide member 212.

Figure 10A:
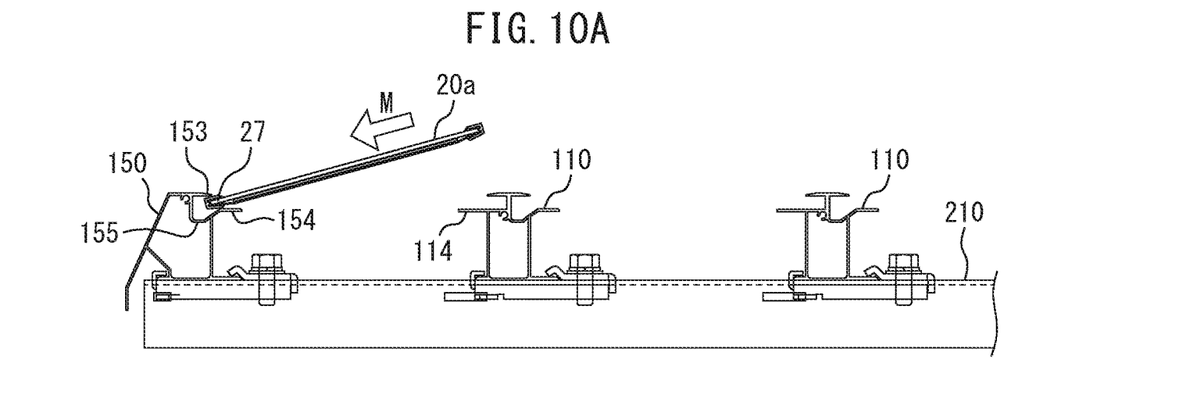
FIG. 10A is a view showing a routine for fastening a solar cell module by a fastening device.

As shown in FIG. 10A, between the third module support part 153 and the fourth module support part 154 of the second mounting frame 150, the second side part 27 of the solar cell module 20a is inserted toward the groove 155 from the upward slanted direction (the illustrated arrow M direction).

Figure 10B:
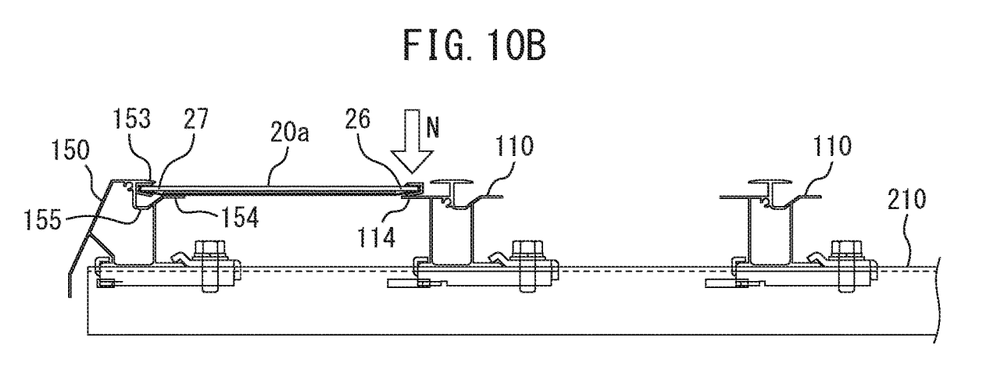
FIG. 10B is a view showing a routine for fastening the solar cell module by the fastening device.

After the second side part 27 is inserted deep into the groove 155, as shown in FIG. 10B, the solar cell module 20a is lowered downward (the illustrated arrow N-direction) and the first side part 26 of the solar cell module 20a is placed on the front end of the second module support part 114 of the first mounting frame 110.

Figure 10C:
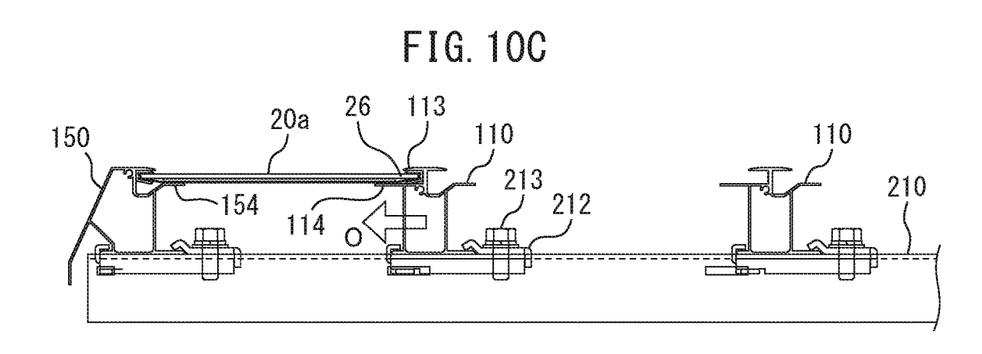
FIG. 10C is a view showing a routine for fastening the solar cell module by the fastening device.

Next, the first mounting frame 110, as shown in FIG. 10C, is made to move in the vertical direction (the illustrated arrow O direction), the first side part 26 of the solar cell module 20a is inserted between the first support surface 113a of the first module support part 113 and the second support surface 114a of the second module support part 114, and the first module support part 113 and the second module support part 114 are used to clamp the first side part 26. After that, the fastening member 213 of the guide member 212 is fastened to fasten the guide member 212 to the vertical beam member 210. Due to this, the fastening operation of the solar cell module 20a is ended.

Figure 10D:
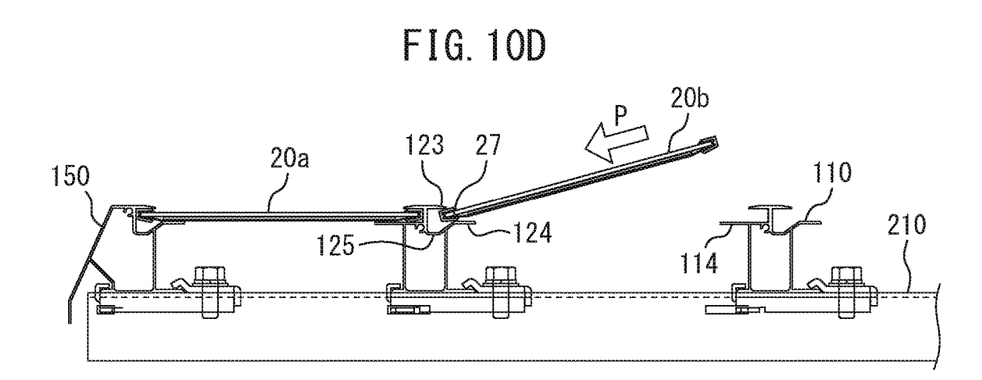
FIG. 10D is a view showing a routine for fastening the solar cell module by the fastening device.

After this, as shown in FIG. 10D, between the third support surface 123a of the third module support part 123 and the fourth support surface 124a of the fourth module support part 124 of the first mounting frame 110, the first side part 26 of the solar cell module 20b is inserted toward the groove 125 in the upward slanted direction (the illustrated arrow P direction). After this, the same process as the solar cell module 20a which is shown in FIG. 10A is performed to fasten the solar cell module 20b.

Above, a fastening device of the solar cell module according to the present embodiment and a fastening method using this fastening device were explained with reference to the drawings.

In the present embodiment, the first side part of the solar cell module 20a which is arranged at the downstream side and the second side part of the solar cell module 20b which is arranged at the upstream side were fastened using a single first mounting frame, but the first mounting frame which holds the first side part and the second mounting frame which holds the second side part may be separately provided.

A plurality of vertical beam members which were arranged in the vertical direction at the installation surface were used to attach the first mounting frames and second mounting frame to the installation surface, but it is also possible to install horizontal beam members which are arranged in the horizontal direction at the installation surface and to install the first mounting frames and second mounting frame on the horizontal beam member to be able to slide in the horizontal direction.

REFERENCE SIGNS LIST 10. installation surface
20, 20a, 20b, 20c, 20d. solar cell module
21. solar cell panel
22. frame member
23. back surface member
24. top surface
25. bottom surface
26. first side part
27. second side part
110, 110a, 110b, 110c. fastening device
110. first mounting frame
111, 151, 311. base part
117. connecting part
113. first module support part
113a. first support surface
114. second module support part
114a. second support surface
115, 116. flange part
123, 153. third module support part
123a, 153a. third support surface
124, 154. fourth module support part
124a, 154a. fourth support surface
150. second mounting frame
210. vertical beam member
212. guide member
216. slit
230, 230a. end cover
231. elongated hole
240. support rail

The invention claimed is:

1. A fastening device which fastens and supports a plurality of solar cell modules comprising:
    a base part,
    a first module support part which has a first support surface that is able to support a first solar cell module and which is provided at the base part to be able to be elastically displaced,
    a second module support part which has a second support surface that is able to support the first solar cell module and which is provided at the base part, wherein the second support surface is arranged so that the second support surface is away from the first support surface of the first module support part, when not elastically displaced, at a constant first interval,
    a third module support part which has a third support surface that is able to support a second solar cell module and which is provided at the base part at the opposite side of the first module support part to be able to be elastically displaced,
    a fourth module support part which has a fourth support surface that is able to support the second solar cell module and which is provided at the base part at the opposite side of the second module support part, wherein the fourth module support surface is arranged so that the fourth module support surface is away from the third support surface of the third module support part, when not elastically displaced, at a constant second interval which is smaller than the constant first interval,
    a guide member which holds the base part movably in a direction parallel to the second support surface, and
    a beam to which the base part is fastened by a bolt wherein the beam has a slit on a top surface thereof that guides the guide member in a guide member's moving direction and the beam has on a side surface thereof an elongated hole which is elongated in the same direction as the guide member's moving direction,
    wherein the constant second interval is smaller than a thickness of the first and second solar cell modules, and
    the elastically displaceable first and third module support parts are designed such that, when the second solar cell module is inserted between the third and fourth module support parts, the third module support part is displaced upward so that the first module support part pushes down on the first solar cell module that has been already inserted between the first and second module support parts prior to the insertion of the second solar cell module,
    wherein the first module support part and the third module support part are formed as a single continuous flat plate, and the single continuous flat plate directly contacts both the first solar cell module and the second solar cell module,
    the guide member comprises a projecting part, and
    the maximum range of movement of the guide member is restricted by the projecting part abutting against an end part of the elongated hole when the guide member moves guided by the slit with the projecting part being inserted into the elongated hole,
    a difference of length between a length by which the first support surface supports the first solar cell module and a length by which the second support surface supports the first solar cell module is longer than the maximum range of movement of the guide member, and
    the projecting part penetrates through the elongated hole so that an end of the projecting part is exposed outside of the beam, and the bolt penetrates through the slit so that a top of the bolt is exposed outside of the beam.

2. The fastening device of claim 1, which has a groove between a joined part of the base part and the fourth module support part, and the fourth support surface.

3. A fastening method using the fastening device of claim 1 to fasten the plurality of solar cell modules, the fastening method comprising:
    inserting the first solar cell module between the first support surface and the second support surface and
    inserting the second solar cell module between the third support surface and the fourth support surface to bias the third support surface to make the third module support part and the first module support part elastically displace so that the first support surface pushes the first solar cell module to thereby fasten the first solar cell module.

* * * * *